(12) United States Patent
Faitelson et al.

(10) Patent No.: US 9,251,363 B2
(45) Date of Patent: Feb. 2, 2016

(54) SYSTEMS AND METHODOLOGIES FOR CONTROLLING ACCESS TO A FILE SYSTEM

(71) Applicant: VARONIS SYSTEMS, INC., New York, NY (US)

(72) Inventors: Yakov Faitelson, New York, NY (US); Ohad Korkus, New York, NY (US)

(73) Assignee: VARONIS SYSTEMS, INC., New York, NY (US)

( * ) Notice: Subject to any disclaimer, the term of this patent is extended or adjusted under 35 U.S.C. 154(b) by 50 days.

(21) Appl. No.: 13/771,527

(22) Filed: Feb. 20, 2013

(65) Prior Publication Data

US 2014/0236999 A1 Aug. 21, 2014

(51) Int. Cl.
*G06F 17/30* (2006.01)
*G06F 21/62* (2013.01)

(52) U.S. Cl.
CPC ........ *G06F 21/6218* (2013.01); *G06F 17/3007* (2013.01)

(58) Field of Classification Search
CPC .......................... G06F 17/3007; G06F 21/6218
USPC .................................. 707/781, 783, 785, 786
See application file for complete search history.

(56) References Cited

U.S. PATENT DOCUMENTS

2007/0214497 A1\* 9/2007 Montgomery et al. ........... 726/4
2008/0271157 A1\* 10/2008 Faitelson et al. ................ 726/27
2009/0019516 A1 1/2009 Hammoutene et al.

OTHER PUBLICATIONS

An International Search Report and a Written Opinion both dated Mar. 28, 2014, which issued during the prosecution of Applicant's PCT/IL2013/050921.

\* cited by examiner

*Primary Examiner* — Jorge A Casanova
(74) *Attorney, Agent, or Firm* — Ladas & Parry LLP

(57) ABSTRACT

A method for controlling access to a file system having data elements, including the steps of maintaining a record of respective actual accesses by users of the file system to the data elements, defining a proposed removal of a set of the users from a superset of the users, wherein members of the superset have common access privileges to a portion of the data elements, and wherein following an implementation of the proposed removal, members of the set retain respective proposed residual access permissions, ascertaining, prior to the implementation of the proposed removal, that at least one of the respective actual accesses are disallowed to the members of the set, or to non-members of the set having actual access profiles which are similar to the actual access profiles of the members of the set, by the respective proposed residual access permissions, and generating an error indication, responsively to the ascertaining.

8 Claims, 3 Drawing Sheets

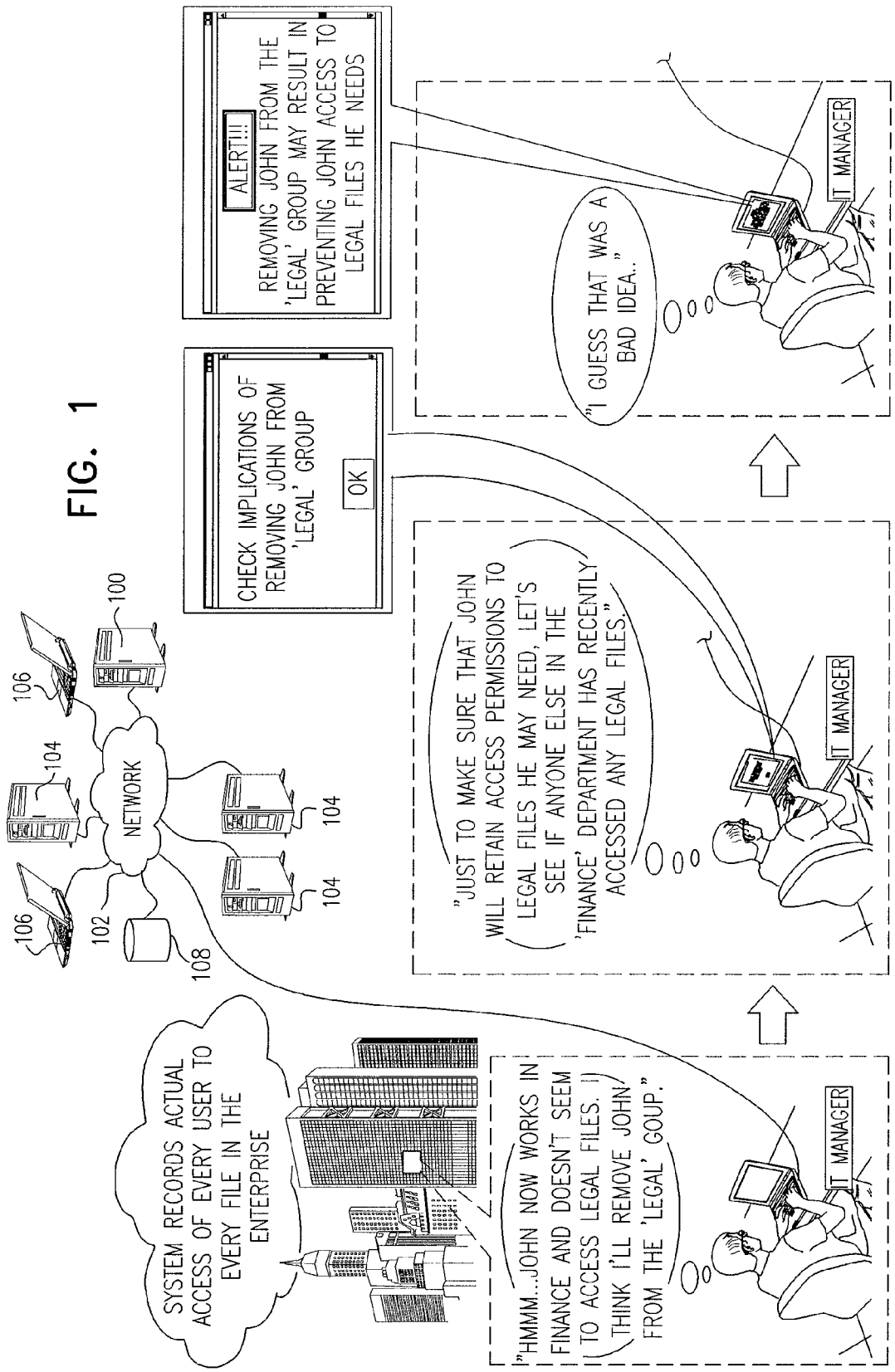

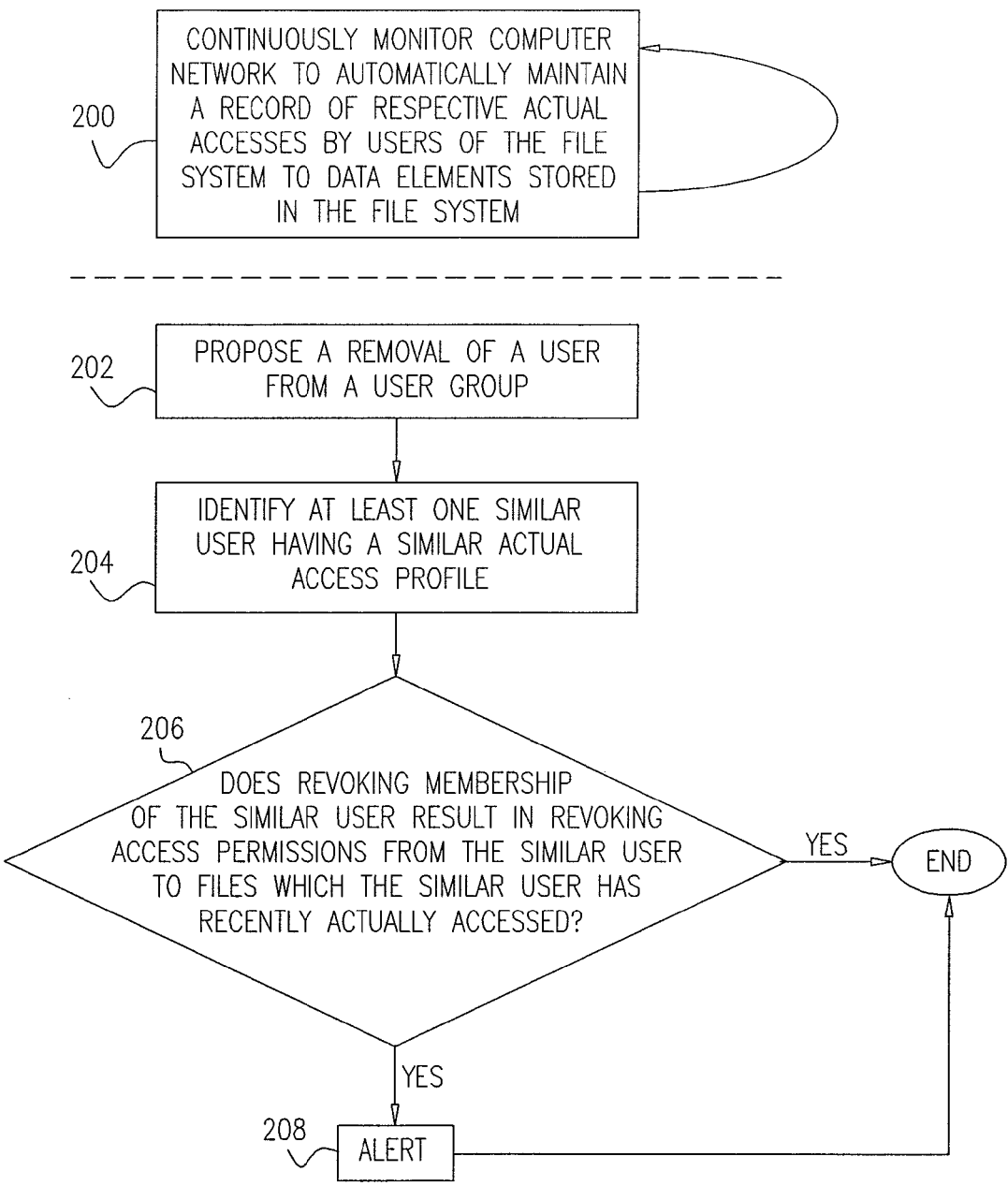

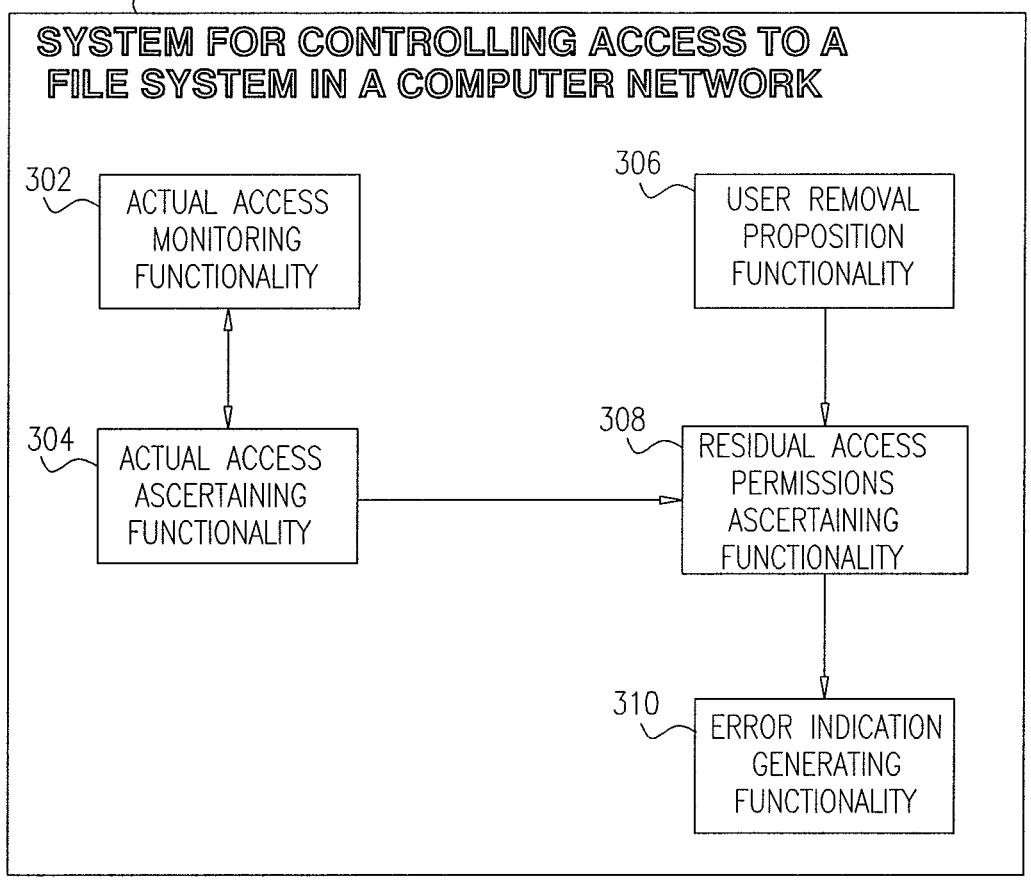

SYSTEMS AND METHODOLOGIES FOR CONTROLLING ACCESS TO A FILE SYSTEM

REFERENCE TO RELATED APPLICATIONS

Reference is made to the following patents and patent applications, owned by assignee, the disclosures of which are hereby incorporated by reference:

U.S. Pat. Nos. 7,555,482 and 7,606,801;

U.S. Published Patent Application Nos. 2007/0244899, 2008/0271157, 2009/0100058, 2009/0119298; 2009/0265780; 2011/0010758; 2011/0060916; 2011/0061093, 2011/0061111, 2011/0184989, 2011/0296490 and 2012/0054283; and U.S. patent application Ser. Nos. 13/106,023; 13/159,903; 13/303,826 and 13/413,748.

FIELD OF THE INVENTION

The present invention relates generally to computer-implemented systems and methodologies for controlling access to a file system having data elements.

BACKGROUND OF THE INVENTION

Access permissions to elements of a file system in an enterprise are typically granted and revoked to an individual based on the role of the individual in the enterprise. Updating the access permissions to constantly correspond to ever-changing roles in an organization is a complex challenge.

SUMMARY OF THE INVENTION

The present invention seeks to provide computer-implemented systems and methodologies for controlling access to a file system having data elements.

There is thus provided in accordance with a preferred embodiment of the present invention a computer-implemented method for controlling access to a file system having data elements, including the steps of maintaining a record of respective actual accesses by users of the file system to the data elements, defining a proposed removal of a set of the users from a superset of the users, wherein members of the superset have common access privileges to a portion of the data elements, and wherein following an implementation of the proposed removal, members of the set retain respective proposed residual access permissions to the data elements, automatically ascertaining, prior to the implementation of the proposed removal, that at least one of the respective actual accesses are disallowed to the members of the set, or to non-members of the set having actual access profiles which are similar to the actual access profiles of the members of the set, by the respective proposed residual access permissions, and generating an error indication, responsively to the step of automatically ascertaining.

Preferably, the data elements include files and directories, the file system includes a hierarchy of the files and directories, and the portion of the data elements includes a first directory and all of the files and directories below the first directory in the hierarchy.

Preferably, the users have memberships in respective alternative user groups, each of the alternative user groups having group permissions to access respective alternative portions of the data elements, wherein the respective proposed residual access permissions of the users include the group permissions of the alternative user groups. Preferably, the step of maintaining a record includes constructing an aggregated table of unique actual accesses by the users. Preferably, the step of defining a proposed removal is performed automatically.

There is also provided in accordance with another preferred embodiment of the present invention a computer-implemented system for controlling access to a file system having data elements stored thereon, including actual access monitoring functionality operable for maintaining a record of respective actual accesses by users of the file system to the data elements, user removal proposition functionality operable for defining a proposed removal of a set of the users from a superset of the users, wherein members of the superset have common access privileges to a portion of the data elements, and wherein following an implementation of the proposed removal, members of the set retain respective proposed residual access permissions to the data elements, residual access permissions ascertaining functionality operable for automatically ascertaining, prior to the implementation of the proposed removal, that at least one of the respective actual accesses are disallowed to the members of the set, or to non-members of the set having actual access profiles which are similar to the actual access profiles of the members of the set, by the respective proposed residual access permissions, and error indication generating functionality operable for generating an error indication, responsively to the step of automatically ascertaining.

Preferably, the data elements include files and directories, the file system includes a hierarchy of the files and directories, and the portion of the data elements includes a first directory and all of the files and directories below the first directory in the hierarchy.

Preferably, the users have memberships in respective alternative user groups, each of the alternative user groups having group permissions to access respective alternative portions of the data elements, wherein the respective proposed residual access permissions of the users include the group permissions of the alternative user groups.

BRIEF DESCRIPTION OF THE DRAWINGS

The present invention will be understood and appreciated more fully from the following detailed description taken in conjunction with the drawings in which:

FIG. 1 is a simplified pictorial illustration of an example of steps in the operation of a method for controlling access to a file system having data elements stored thereon, operative in accordance with a preferred embodiment of the present invention;

FIG. 2 is a simplified block diagram illustration of steps in the operation of the method of FIG. 1; and FIG. 3 is a simplified block diagram illustration of a system for controlling access to a file system having data elements stored thereon, constructed and operative in accordance with preferred embodiments of the present invention.

DETAILED DESCRIPTION OF PREFERRED EMBODIMENTS

Reference is now made to FIG. 1, which is a simplified pictorial illustration of an example of steps in the operation of a method for controlling access to a file system having data elements stored thereon, operative in accordance with a preferred embodiment of the present invention.

The method illustrated in FIG. 1 is preferably implemented by a system which typically resides on a server 100 connected to an enterprise-wide computer network 102 having disparate servers 104 and computers 106 connected thereto. Network

102 preferably also comprises a multiplicity of storage resources 108, which typically reside within servers 104 and\or computers 106.

The system of server 100 preferably continuously monitors network 102 to automatically maintain a record of respective actual accesses by users of the file system to data elements stored on storage resources 108.

It is appreciated that access permissions of users to data elements in an enterprise network are typically controlled by controlling membership of the users to user groups, which user groups have access permissions to the data elements. In the example of FIG. 1, a 'legal' user group may have access permissions to files containing legal information, and a 'finance' user group may have access permissions to files containing finance related information.

As shown in FIG. 1, an IT Manager of network 102 of a company utilizes the system of server 100 to ascertain that John, a former employee of the legal department of the company and a current employee of the finance department of the company, has not recently accessed legal files, while retaining membership to the 'legal' user group. Therefore, the IT Manager further utilizes the system of server 100 to propose the removal of John from the 'legal' user group, which removal may potentially revoke access permissions from John to legal files to which members of the 'legal' user group have access permissions, and to which John may require access to in the future.

It is appreciated that John may be a member of additional user groups having access permissions to the legal files, and it is therefore appreciated that even after implementing the proposed removal of John from the 'legal' user group, John may still retain residual access permissions to the legal files.

As further shown in FIG. 1, the IT Manager further queries the system of server 100 to automatically ascertain, prior to the implementation of the proposed removal, that following the implementation of the proposed removal, John will retain residual access permissions to files to which he may require access.

It is a particular feature of this embodiment of the present invention that in order to ascertain whether, following the implementation of a proposed removal of a first member of a user group from the user group, the first member will retain residual access permissions to files to which he may need access to, it typically suffices to ascertain whether after a removal of at least one other member of the user group, which at least one other member has an actual access profile similar to that of the first member, the at least one other member will retain residual access permissions to files to which he has recently actually accessed. For the purposes of the present application, the term "actual access profile" is defined as the collection of recent actual file accesses of a particular user. A detailed description of a method for ascertaining similarity between actual access profiles is described in detail in U.S. Pat. No. 7,606,801 of the applicants, incorporated by reference herein.

It is therefore appreciated that with regard to the example of FIG. 1, in order to ascertain which files John will continue to require access to, the system of server 100 is operative to ascertain which files users having actual access profiles that are similar to John's actual access profile have recently actually accessed. In the example of FIG. 1, users having actual access profiles that are similar to John's actual access profile may be, for example, employees of the finance department.

Alternatively, in order to ascertain whether, following the implementation of a proposed removal of a member of a user group from the user group, the member will retain residual access permissions to files to which he may need access to, the system of server 100 may ascertain whether after the removal of the member from the user group, the member will retain residual access permissions to files to which he has recently actually accessed. A detailed description of this method is described in detail in U.S. Published Patent Application 2008/0271157 of the applicants, incorporated by reference herein.

As further shown in FIG. 1, responsive to the IT manager querying the system of server 100, the IT Manager receives an alert from the system of server 100, notifying the IT Manager that revoking John's membership from the 'legal' group may result in revoking access permissions from John to files which he may need access to. It is appreciated that in order to ascertain whether revoking a user's membership from a group may result in denying the user access to files which he may need, the system of server preferably ascertains whether revoking membership of a similar user from the group would result in revoking access permissions from the similar user to files which the similar user has recently actually accessed.

Reference is now made to FIG. 2, which is a simplified block diagram illustration of steps in the operation of the method of FIG. 1. As shown in FIG. 2, the method comprises continuously monitoring a computer network to automatically maintain a record of respective actual accesses by users of the file system to data elements stored in the file system (200).

Preferably, the method also includes proposing a removal of a user from a user group (202). After identifying at least one similar user having an actual access profile which is similar to the actual access profile of the user (204), the method includes ascertaining whether revoking membership of the similar user would result in revoking access permissions from the similar user to files which the similar user has recently actually accessed (206). If revoking membership of the similar user would result in revoking access permissions from the similar user to files which the similar user has recently actually accessed, the method includes providing an alert stating that revoking the user's membership from the group may result in revoking access permissions from the user to files which he may need access to (208).

Reference is now made to FIG. 3, which is a simplified block diagram illustration of a system 300 for controlling access to a file system in a computer network, the file system having data elements stored thereon, the system being constructed and operative in accordance with preferred embodiments of the present invention.

Preferably, system 300 includes actual access monitoring functionality 302 operative to continuously monitor a computer network having a file system residing thereon, to automatically maintain a record of respective actual accesses by users of the file system to data elements stored thereon.

Preferably, system 300 also includes actual access ascertaining functionality 304 operative to utilize the record maintained by actual access monitoring functionality 302 to ascertain whether users have recently accessed any particular data elements. System 300 also preferably includes user removal proposition functionality 306 operable for proposing the removal of a member of a user group from the user group.

Preferably, system 300 also includes residual access permissions ascertaining functionality 308 operable to utilize information received from actual access ascertaining functionality 304 for ascertaining, prior to the implementation of a proposed removal of a member of a user group from the user group, that following the implementation of the proposed removal, the member will retain access permissions to files to which he has actually accessed in the past and to which he therefore may require access in the future.

It is a particular feature of a preferred embodiment of the present invention that system 300 that residual access permissions ascertaining functionality 308 is also operable to utilize information received from actual access ascertaining functionality 304 for ascertaining whether after a removal of at least one similar member of a user group, which at least one other similar has an actual access profile similar to that of a second group member, the at least one similar member will retain residual access permissions to files to which he has recently actually accessed, and thereby ascertaining that the second member will retain access permissions to files to which he may require access in the future.

Preferably, system 300 also includes error indication generating functionality operative to generate an error indication responsive to an output of residual access permissions ascertaining functionality 308.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. A computer-implemented method for controlling access to a file system having data elements, comprising the steps of:
   maintaining a record of respective actual accesses by users of said file system to said data elements, said users being organized in a user hierarchy;
   defining a proposed removal of a set of said users from a superset of said users, wherein members of said superset have common access privileges to a portion of said data elements, and wherein following an implementation of said proposed simulated removal, members of said set retain respective proposed residual access permissions to said data elements;
   automatically ascertaining, prior to said implementation of said proposed removal, whether at least one of said respective actual accesses are disallowed to non-members of said set by said respective proposed residual access permissions, said non-members of said set having actual access profiles which are similar to the actual access profiles of said members of said set, said members of said set being nondescendants of said non-members of said set in said user hierarchy; and
   generating an error indication, responsively to said step of automatically ascertaining.

2. A computer-implemented method according to claim 1, wherein said data elements comprise files and directories, and wherein said file system comprises a hierarchy of said files and directories, and wherein said porion of said data elements comprises:
   a first directory; and
   all of said files and directories below said first directory in said hierarchy.

3. A computer-implemented method according to claim 1, wherein said users have memberships in respective alternative user groups, each of said alternative user groups having group permissions to access respective alternative portions of said data elements, wherein said respective proposed residual access permissions of said users comprise said group permissions of said alternative user groups.

4. A computer-implemented method according to claim 1, wherein said step of maintaining a record comprises constructing an aggregated table of unique actual accesses by said users.

5. A computer-implemented method according to claim 1, wherein said step of defining a proposed removal is performed automatically.

6. A computer-implemented system comprising a non-transitory, tangible computer-readable medium in which computer program instructions are stored, which instructions, when read by a computer, cause the computer to control access to a file system having data elements stored thereon, said system comprising:
   actual access monitoring functionality operable for maintaining a record of respective actual accesses by users of said file system to said data elements, said users being organized in a user hierarchy;
   user removal proposition functionality operable for defining a proposed removal of a set of said users from a superset of said users, wherein members of said superset have common access privileges to a portion of said data elements, and wherein following an implementation of said proposed simulated removal, members of said set retain respective proposed residual access permissions to said data elements;
   residual access permissions ascertaining functionality operable for automatically ascertaining, prior to said implementation of said proposed removal, whether at least one of said respective actual accesses are disallowed to non-members of said set by said respective proposed residual access permissions, said non-members of said set having actual access profiles which are similar to the actual access profiles of said members of said set, said members of said set being nondescendants of said non-members of said set in said user hierarchy; and
   error indication generating functionality operable for generating an error indication, responsively to said step of automatically ascertaining.

7. A computer-implemented system of claim 6 and wherein said users have memberships in respective alternative user groups, each of said alternative user groups having group permissions to access respective alternative portions of said data elements, wherein said respective proposed residual access permissions of said users comprise said group permissions of said alternative user groups.

8. A computer-implemented system of claim 6, wherein said data elements comprise files and directories, and wherein said file system comprises a hierarchy of said files and directories, and wherein said portion of said data elements comprises:
   a first directory; and
   all of said files and directories below said first directory in said hierarchy.

* * * * *